US012643712B2

(12) United States Patent
Allen et al.

(10) Patent No.: US 12,643,712 B2
(45) Date of Patent: Jun. 2, 2026

(54) HANDHELD DUAL CONTAINER

(71) Applicants: Warner A. Allen, Covington, KY (US); John T. Brenning, Covington, KY (US)

(72) Inventors: Warner A. Allen, Covington, KY (US); John T. Brenning, Covington, KY (US)

( * ) Notice: Subject to any disclaimer, the term of this patent is extended or adjusted under 35 U.S.C. 154(b) by 0 days.

(21) Appl. No.: 18/561,419

(22) PCT Filed: May 19, 2022

(86) PCT No.: PCT/US2022/030142
§ 371 (c)(1),
(2) Date: Nov. 16, 2023

(87) PCT Pub. No.: WO2022/246138
PCT Pub. Date: Nov. 24, 2022

(65) Prior Publication Data

US 2024/0246723 A1 Jul. 25, 2024

Related U.S. Application Data

(60) Provisional application No. 63/190,751, filed on May 19, 2021.

(51) Int. Cl.

| | |
|---|---|
| ***B65D 21/02*** | (2006.01) |
| ***B44D 3/12*** | (2006.01) |
| ***B65D 25/22*** | (2006.01) |
| ***B65D 25/28*** | (2006.01) |

(52) U.S. Cl.
CPC ......... *B65D 21/0204* (2013.01); *B44D 3/122* (2013.01); *B65D 21/0233* (2013.01); *B65D 25/22* (2013.01); *B65D 25/2811* (2013.01)

(58) Field of Classification Search
CPC ............ B65D 21/0204; B65D 21/0233; B65D 25/2811; B65D 25/22; B65D 21/0202; B65D 21/0201; B65D 21/0205; B44D 3/122
USPC .............................. 206/518; 220/23.4, 23.83
See application file for complete search history.

(56) References Cited

U.S. PATENT DOCUMENTS

| | | | | | |
|---|---|---|---|---|---|
| 2,674,389 | A * | 4/1954 | Baker | B44D 3/122 | 220/23.4 |
| 2,738,893 | A * | 3/1956 | Quinones, Jr. | A47J 47/18 | 114/352 |
| 3,409,193 | A * | 11/1968 | Metcalf | B65D 25/20 | 206/387.1 |
| 5,242,071 | A * | 9/1993 | Goebel | B65D 21/068 | 220/4.26 |
| 5,316,159 | A * | 5/1994 | Douglas | B65D 81/3288 | 206/432 |

(Continued)

*Primary Examiner* — Steven A. Reynolds
(74) *Attorney, Agent, or Firm* — FBT Gibbons LLP

(57) ABSTRACT

A handheld dual container includes a first fluid container and a second fluid container. Each of the first fluid container and the second fluid container includes a bottom portion, one or more first sidewalls extending upward from the bottom portion; and a second sidewall adjoining at least one of the one or more first sidewalls and extending upward from the bottom portion. The one or more first sidewalls and the second sidewall define an upper periphery that defines an open top portion. The respective second sidewalls of the first and second fluid containers are releasably attachable to each other.

18 Claims, 9 Drawing Sheets

(56) References Cited

U.S. PATENT DOCUMENTS

| | | | | | |
|---|---|---|---|---|---|
| 5,746,346 | A * | 5/1998 | Crilly | B44D 3/128 | 220/736 |
| 6,123,214 | A * | 9/2000 | Goebel | B65D 21/0204 | 220/520 |
| 7,007,818 | B2 * | 3/2006 | Martin | A47J 47/04 | 206/818 |
| 9,119,490 | B1 * | 9/2015 | Parodi, Jr. | A47G 19/22 | |
| 12,208,940 | B1 * | 1/2025 | Kendall | B65D 51/1683 | |
| 2006/0243732 | A1 * | 11/2006 | Bergman | B44D 3/126 | 220/757 |
| 2009/0095568 | A1 * | 4/2009 | Webster | E06C 7/14 | 248/210 |
| 2022/0258529 | A1 * | 8/2022 | Alvarez | A46B 17/06 | |

* cited by examiner

HANDHELD DUAL CONTAINER

PRIORITY

This application claims priority to International Patent Application No. PCT/US22/30142 filed May 19, 2022, which itself claims the benefit to U.S. Provisional Pat. App. 63/190,751, filed May 19, 2021, both of which are titled "Handheld Dual Container," and hereby incorporates the same applications herein by reference in their entireties.

TECHNICAL FIELD

Embodiments of the technology relate, in general, to systems, apparatuses and methods for handheld fluid containers.

BACKGROUND

Often persons painting walls desire to hold a relatively small amount of paint. A handheld container can hold a small amount of one color of paint, for painting trim, for example. However, it may be that a person painting desires to hold two colors of paint.

DETAILED DESCRIPTION

Figure 1:
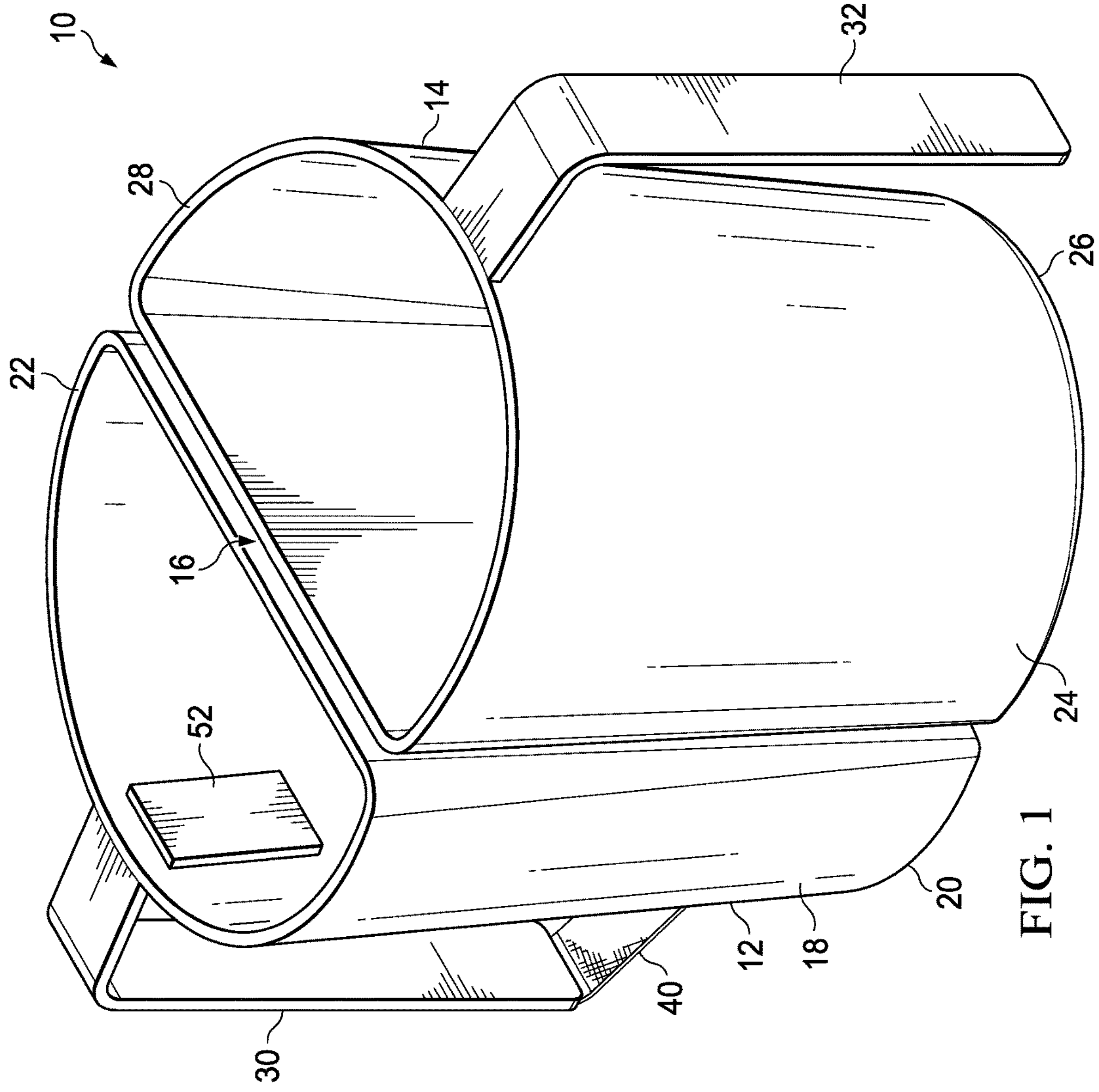
FIG. 1 is a perspective view of an example system and apparatus for handheld dual container.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Referring to FIGS. 1-5, there is shown an example embodiment of a handheld dual container 10 of the present disclosure, including optional configurations and components, as described below. The handheld dual container 10 includes two discrete and removably joined fluid containers, including a first fluid container 12 and a second fluid container 14. As depicted in the illustrated example, the first fluid container 12 and the second fluid container 14 can be of a similar size and shape with each having a portion of an exterior surface that joins at a mating interface 16 with the other. However, the first fluid container 12 and the second fluid container 14 can be different in both size and shape. In an embodiment, the first fluid container 12 has a size relative to the second fluid container 14 such that it can hold a greater amount of fluid, such as paint, than the second fluid container 14. In an embodiment, the first fluid container 12 has a size relative to the second fluid container 14 such that it can fit inside, including "nest" inside for storage and shipment.

Each of the first fluid container 12 and the second fluid container 14 can be an open-topped receptacle for holding fluids, such as paint. For example, the first fluid container 12 can have at least one first sidewall 18 joined at a bottom portion to a first bottom member 20. The at least one first sidewall 18 defines a first upper periphery 22 that further defines a first open top portion. Likewise, the second fluid container 14 can have at least one second sidewall 24 joined at a bottom portion to a second bottom member 26. The at least one second sidewall 24 defines a second upper periphery 28 that further defines a second open top portion. In an embodiment, the general shape of the first fluid container 12 and/or the second fluid container 14 can approximate that of a half-cylinder in which the respective flat or generally flattened sides are juxtaposed at the mating interface 16. However, other shapes and sizes of either the first fluid container 12 and/or the second fluid container 14 can be utilized with no loss of function or benefit.

One or both of the first fluid container 12 and the second fluid container 14 can have a handle. For example, the first fluid container 12 can have a first handle 30 extending from a portion of the first fluid container 12, such as being joined to the at least one first sidewall 18. Likewise, the second fluid container 14 can have a second handle 32 extending from a portion of the second fluid container 14, such as being joined to the at least one second sidewall 24. In an embodiment, as shown in FIGS. 1-5, one or both of the first handle 30 and the second handle 32 can be joined near the top of the sidewall portions of their respective fluid containers, and extend away from their respective fluid containers sufficiently to permit a person using the handheld dual container 10 to hold the handheld dual container 10. In an embodiment, as shown, one or both of the first handle 30 and the second handle 32 can have a substantially inverted L-shape, such that when joined to their respective sidewall portions of their respective fluid containers, a person's hand be inserted between the outer surface of the fluid container, and the inner side of the handle. Thus, a person can comfortably hold either the first fluid container 12 or the second fluid container 14 by sliding his or her hand into and under the inverted L-shape of the handle, with his or her fingers in contact with the outer surface of the fluid container. Other shapes, sizes, and configurations of a handle can be utilized, as desired.

Figure 2:
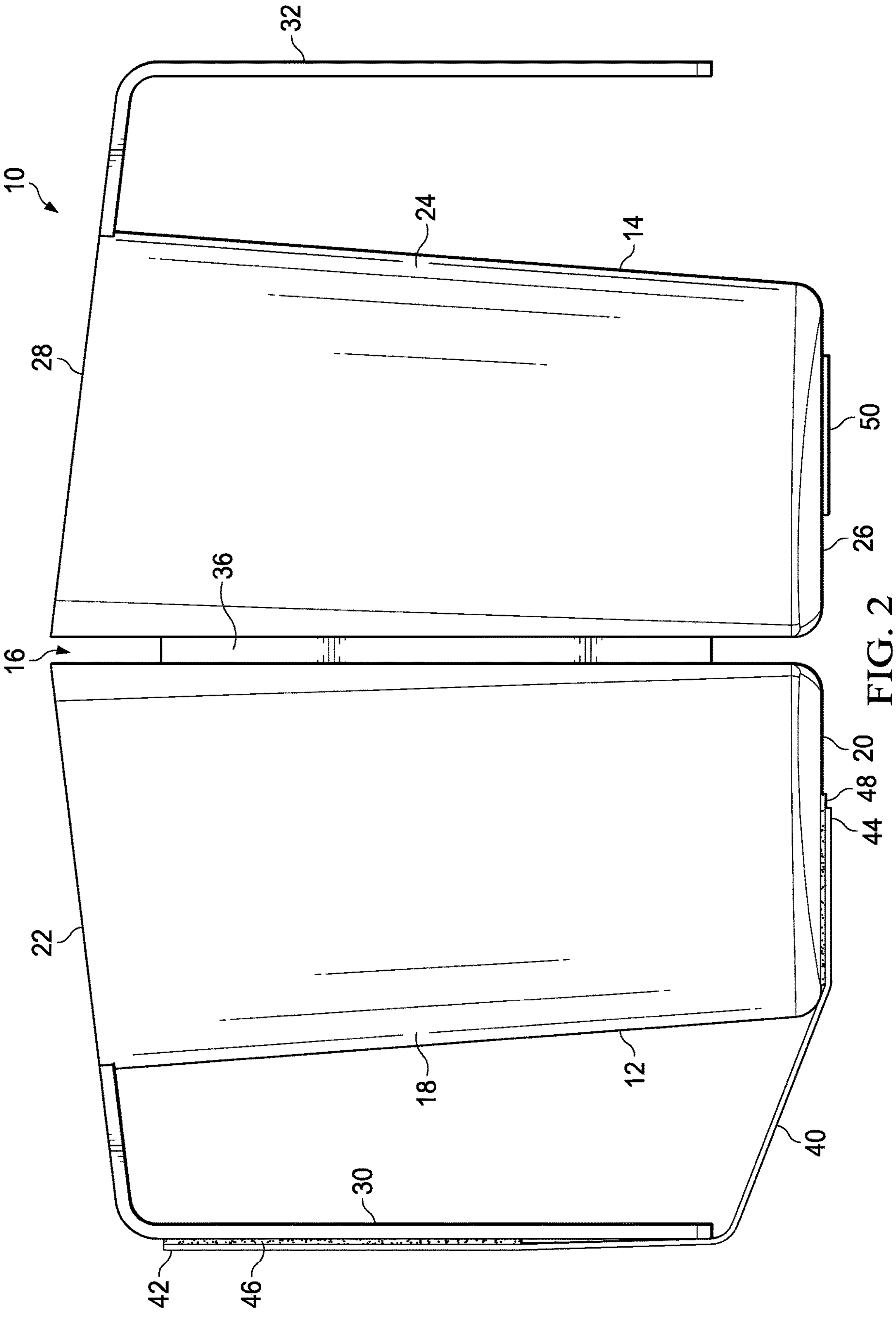
FIG. 2 is a side elevation view of an example system and apparatus for handheld dual container.
Figure 3:
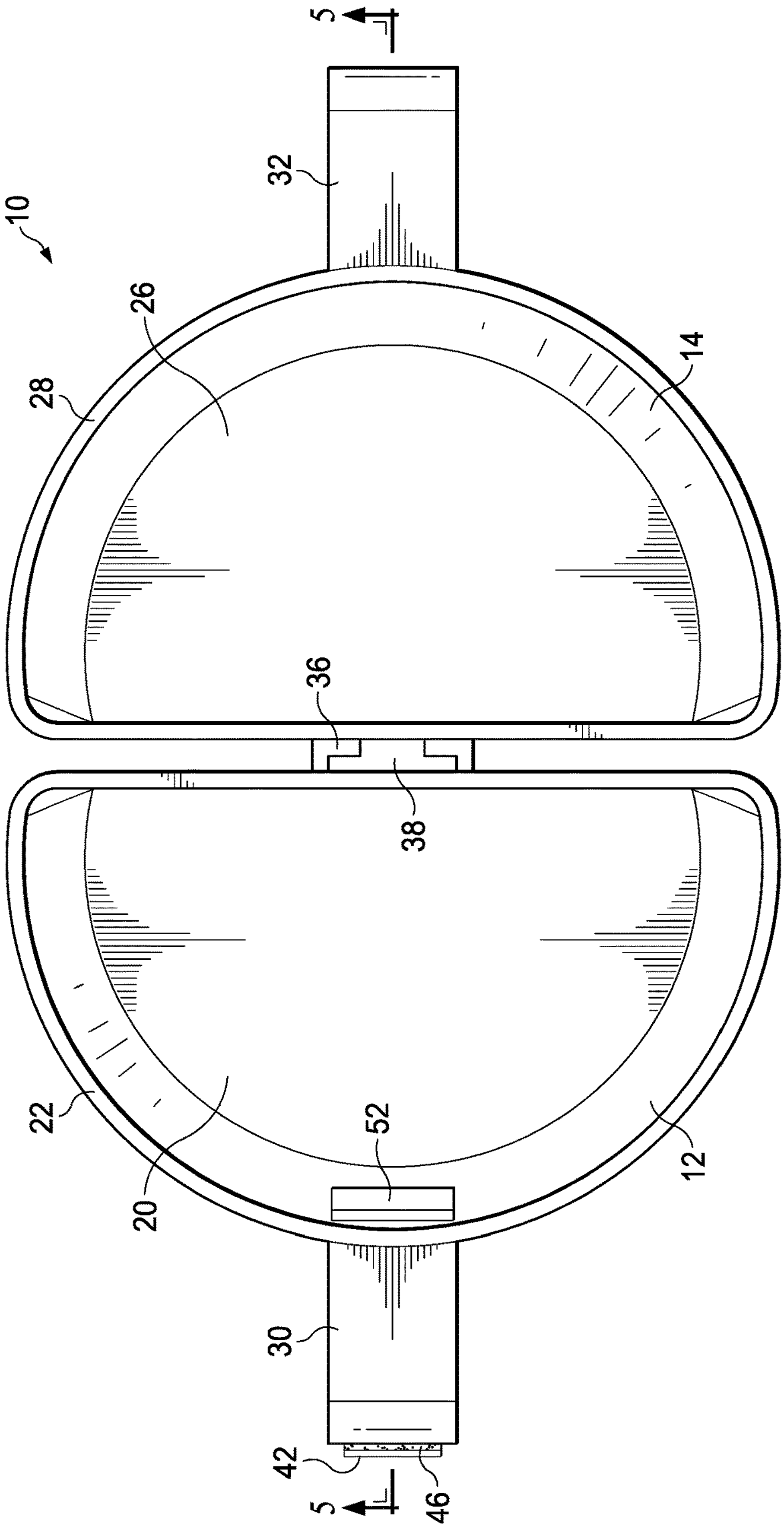
FIG. 3 is a top plan view of an example system and apparatus for a handheld dual container.
Figure 4:
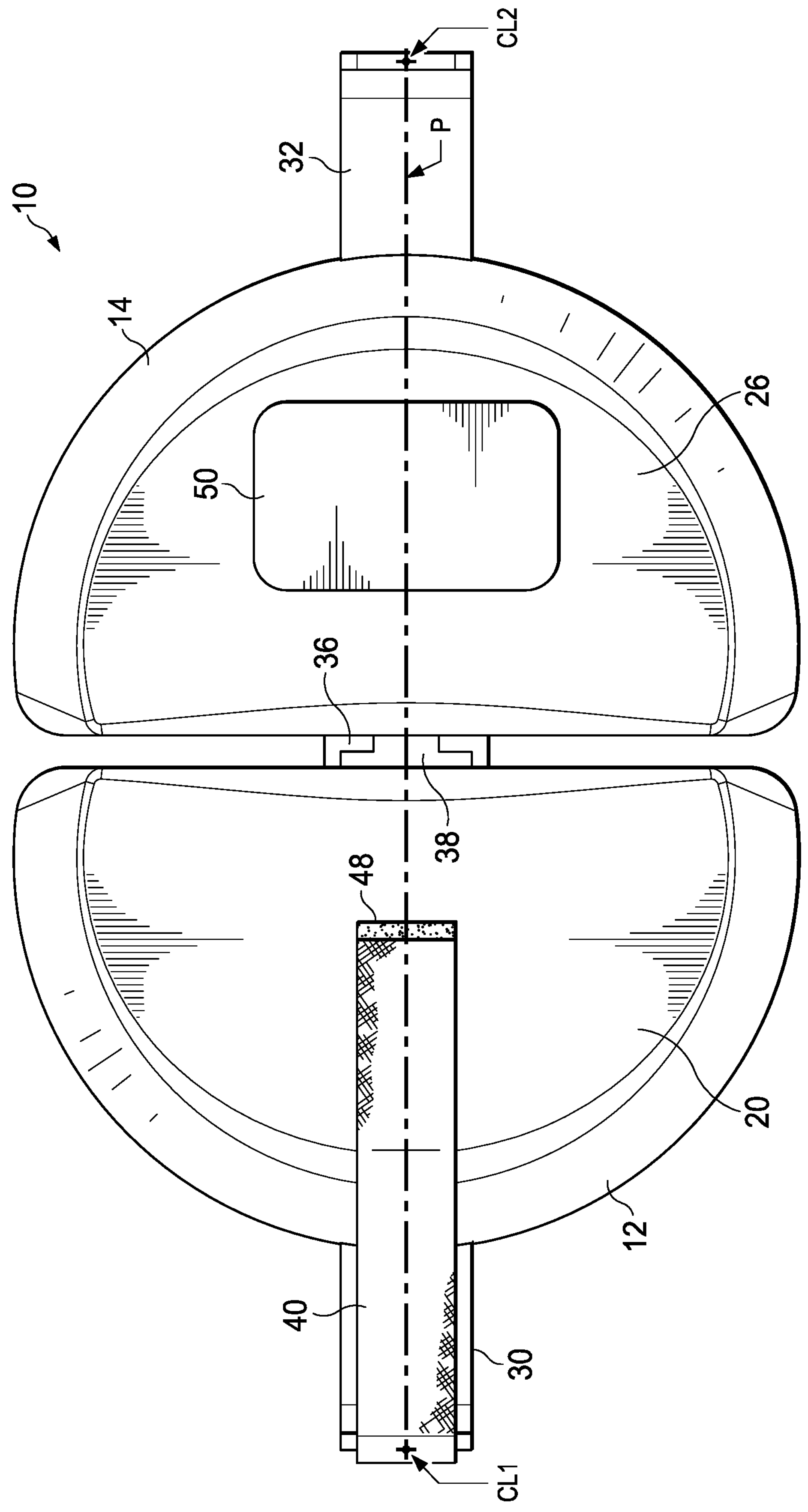
FIG. 4 is a bottom view of an example system and apparatus for a handheld dual container.
Figure 5:
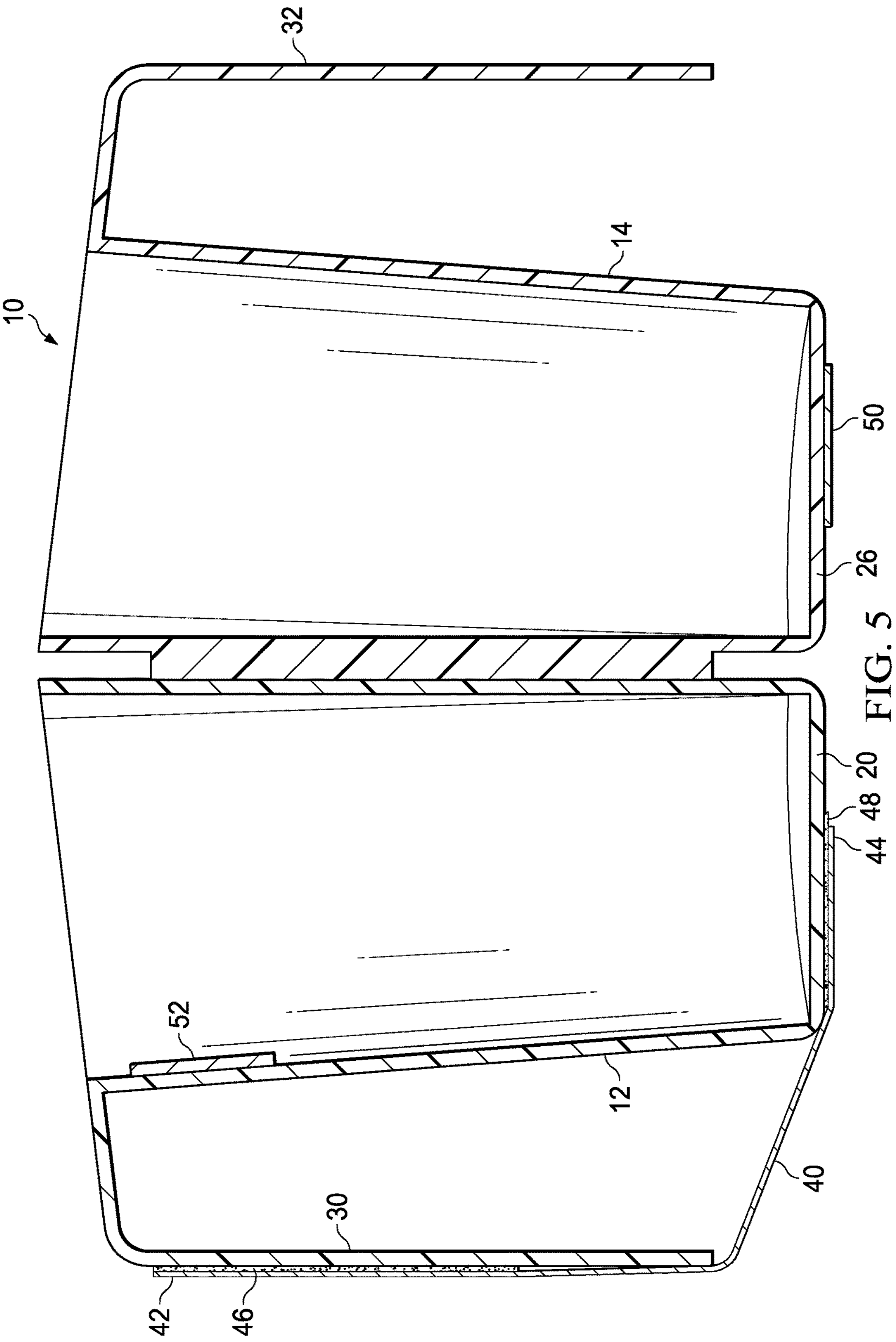
FIG. 5 is a cross sectional view of cross-section 5-5 of FIG. 4.

As depicted in FIGS. 1-5, the first handle 30 and the second handle 32 are disposed opposite to one another, with the handle configuration being such a first vertical centerline CL1 of the first handle 30 and a second vertical centerline CL2 of the second handle 32 reside substantially in the same plane, such as plane P shown in FIG. 4. Plane P effectively bi-sects the handheld dual container 10 into two substantially equal halves. However, other handle configurations can be utilized, including having the handles disposed such that a plane defined by their respective centerlines does not substantially bisect the handheld dual container 10. For example, one or both of the first handle 30 and/or the second handle 32 can be disposed on the handheld dual container 10 nearer to the portion of their respective fluid containers associated with the mating interface 16.

In an embodiment, the handle on either of the first fluid container 12 and the second fluid container 14 is optional, that is, the handheld dual container 10 can be utilized with no handles; the user simply grasps one of the first fluid container 12 and the second fluid container 14 directly. Additionally, in an embodiment, only one of either of the first fluid container 12 and the second fluid container 14 has a first handle, with the second handle being optional, that is, the handheld dual container 10 can be configured and utilized with only one handle.

The first fluid container 12 and the second fluid container 14 can be removably joined at the mating interface 16 by a first joining member 36 and a second joining member 38, respectively, as depicted most clearly in FIGS. 3 and 4. First joining member 36 and a second joining member 38 can cooperate to removeably join the first fluid container 12 and the second fluid container 14. In the illustrated embodiment the first joining member 36 has a two opposing slots and the second joining member 38 has two opposing tongues configured to slide into the two opposing slots for a tongue-in-groove joining member. To join the first fluid container 12 to the second fluid container 14 the two opposing tongues of the second joining member 38 can be slid into the corresponding opposing slots of the first joining member 36. In an embodiment, the first joining member 36 and a second joining member 38 are held by frictional engagement when joined. In other embodiments, the first joining member 36 and the second joining member 38 can be one of adhesive members, magnetic members, hook-and-loop fastening members, and the like.

In an embodiment the handheld dual container 10 can optionally have a hand securing member 40 associated with either or both of the first handle 30 and the second handle 32. As depicted, the first handle 30 has attached thereto the hand securing member 40 in the form of a flexible strap that attaches to the first handle 30 at a first end 42, and to the first bottom member 20 at a second end 44. In an embodiment, the first end 42 and the second end 44 of the hand securing member 40 can attach in a removable configuration by use of, for example, hook and loop fasteners (e.g., VELCRO® fasteners) 46 and 48, respectively.

In an embodiment, one or both of the first fluid container 12 and the second fluid container 14 can optionally have disposed thereon one or more magnetic members. For example, as depicted in FIGS. 2 and 4, an externally disposed ladder magnet 50 can be joined, such as by adhesive, to the bottom member. The ladder magnet 50 can aid in securing the handheld dual container 10 to a portion of a ladder during use. Likewise, one or more paint brush magnets 52, such as depicted in FIGS. 1 and 3 as being internally disposed on the first fluid container 12, can be optionally included to beneficially hold the metal portion of a paintbrush when it is not in use. In an embodiment, a stick-on adhesive-based magnet (not shown in the FIGS.) can be provided, which can be joined to a ladder, such as a non-metallic surface of a ladder. The stick-on magnet, when adhered to a ladder can be utilized to magnetically join the first fluid container 12 or the second fluid container 14 to the ladder, such as, for example, via ladder magnet 50. In an example, the handheld dual container 10 can be sold with the stick-on magnet magnetically adhered to the ladder magnet 50. In this example, the user can remove the stick-on magnet from the ladder magnet 50, adhere it to a surface of a ladder, and then use it to again magnetically join to the ladder magnet 50 as desired. In a further example, the stick-on magnet can be provided magnetically adhered to the ladder magnet 50 as a two-magnet unit. The two-magnet unit can be provided separately with or without the handheld dual container 10. In this example, the ladder magnet 50 can also have an adhesive surface such that it can be adhesively affixed to one or both of the first fluid container 12 and the second fluid container 14, as desired.

The first fluid container 12 and the second fluid container 14 can be made of any suitable material, including plastic. In an embodiment, the first fluid container 12 and the second fluid container 14 are molded plastic, including injection molded.

In an embodiment, the first fluid container 12 and the second fluid container 14 can have joining features that facilitate each of the first fluid container 12 and the second fluid container 14 being exactly the same size and shape, and, thereby, being formed from in a single mold. In an embodiment, for example, each of the first fluid container 12 and the second fluid container 14 can have a joining member that each cooperate with a securing insert to be removeably join the first fluid container 12 and the second fluid container 14. In an example, a flattened stick or rod-like member can be used as a securing insert. Thus, the first joining member and the second joining member can each be identical female, grooved, or notched members, and a securing insert can be a flattened member that is inserted as a male insert into each of the female portions of the first and second joining members. The securing insert can be forced into place and held via friction fit. The securing insert can be wedge shaped and can be forced into securing position by pushing firmly into place. In an embodiment, the securing insert can be multiple components. In an embodiment, the securing insert can have protrusions at one end or both ends that prevent inadvertent removal of the securing insert during use.

Figure 6:
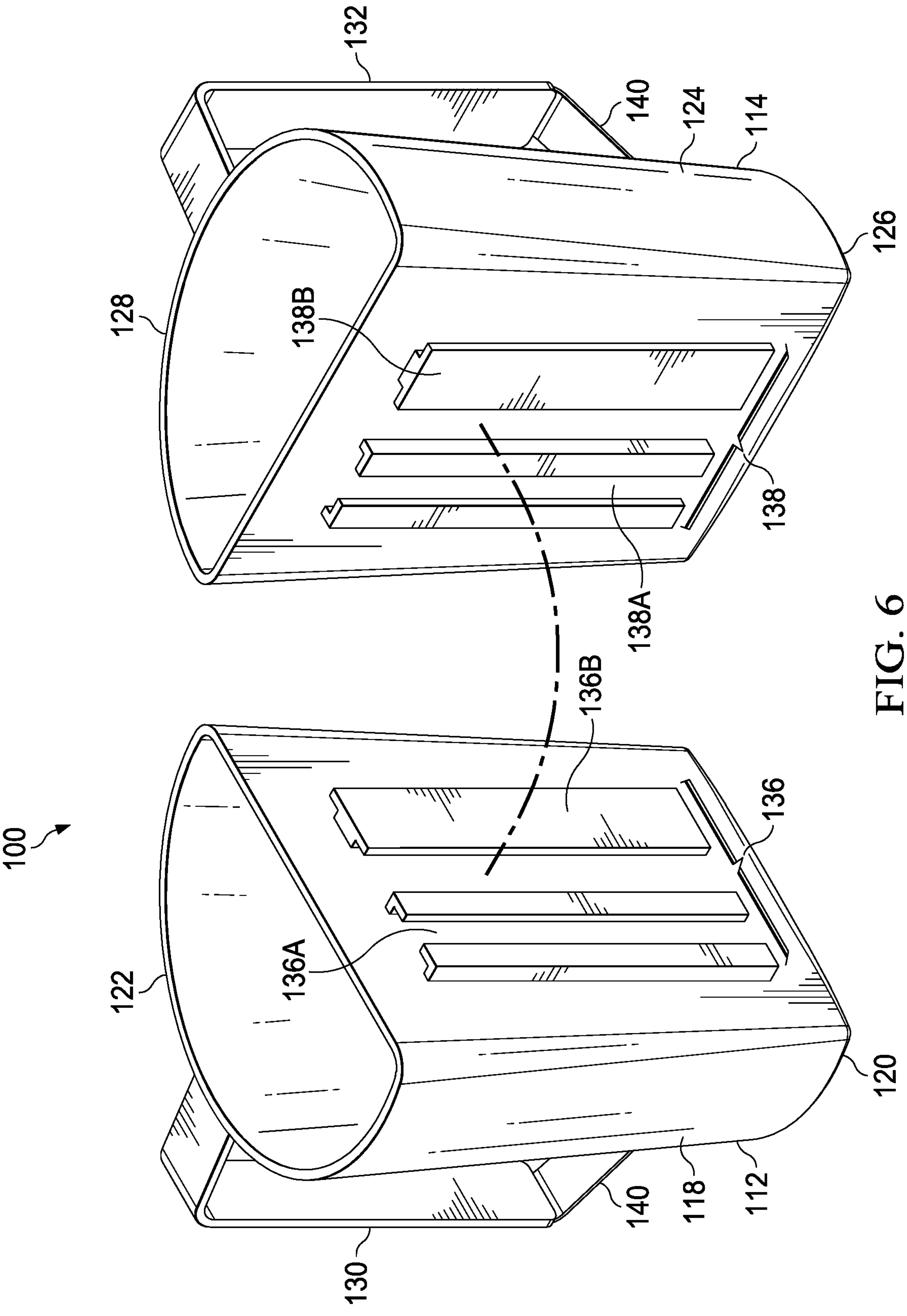
FIG. 6 is a perspective view of an example system and apparatus for handheld dual container.
Figure 7:
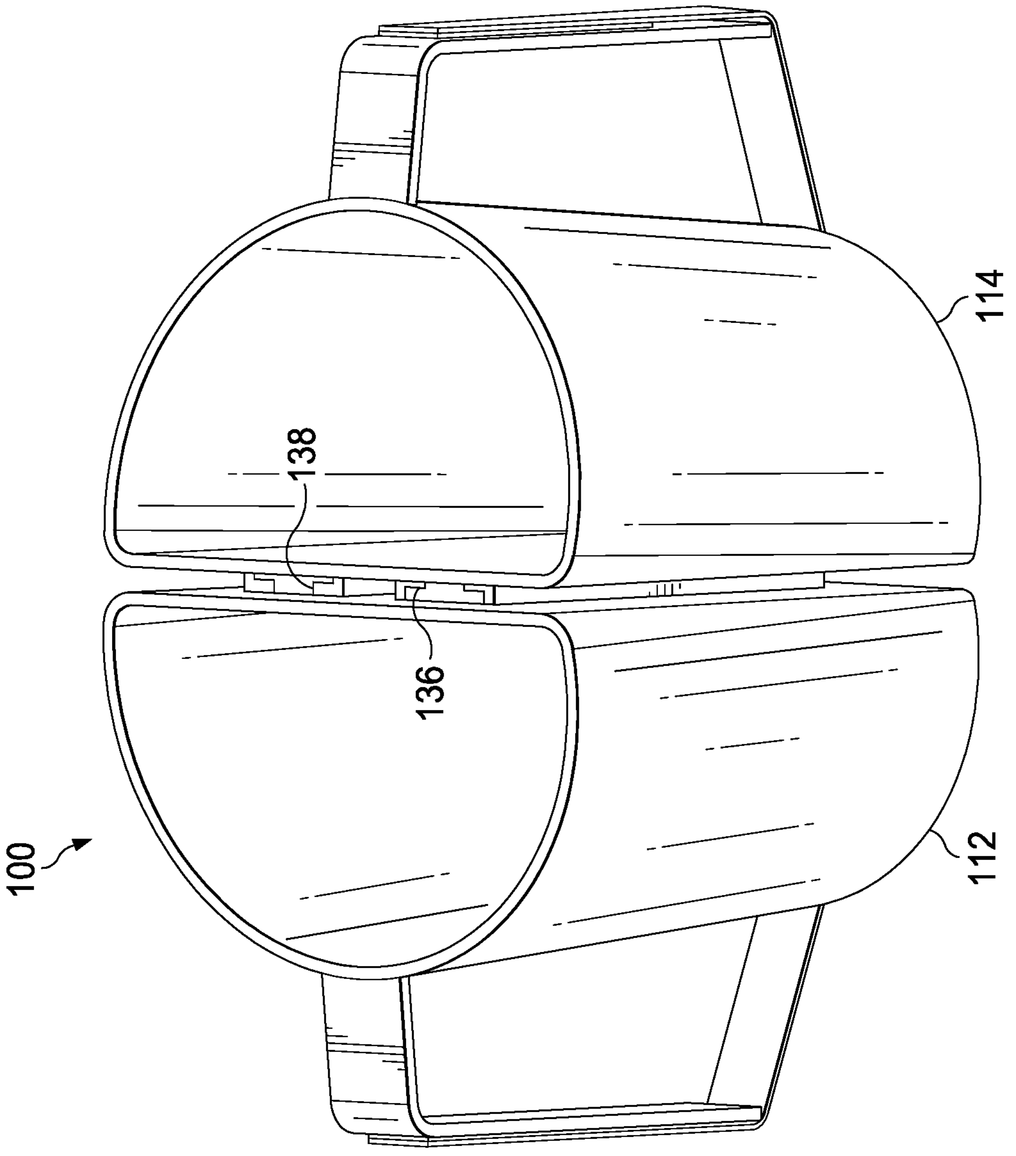
FIG. 7 is a perspective view of an example system and apparatus for handheld dual container.

Referring to FIGS. 6-7, there is shown an example embodiment of a handheld dual container 100 of the present disclosure that can have any or all of the features disclosed above, but which has joining features that facilitate each of the first fluid container 112 and the second fluid container 114 being exactly the same size and shape, and, thereby, being formed from in a single mold. The handheld dual container 100 includes two discrete and removably joined fluid containers, including a first fluid container 112 and a second fluid container 114. As depicted in the illustrated example, the first fluid container 112 and the second fluid container 114 can be of substantially equal size and shape with each having a portion of an exterior surface that joins at a mating interface 116 with the other. However, the first fluid container 112 and the second fluid container 114 can be different in both size and shape as long as the connection members join, as disclosed herein. In an embodiment, the first fluid container 112 has a size relative to the second fluid container 114 such that it can hold a greater amount of fluid, such as paint, than the second fluid container 114. In an embodiment, the first fluid container 112 has a size relative to the second fluid container 114 such that it can fit inside, including "nest" inside for storage and shipment.

Each of the first fluid container 112 and the second fluid container 114 can be an open-topped receptacle for holding fluids, such as paint. For example, the first fluid container 112 can have at least one first sidewall 118 joined at a bottom portion to a first bottom member 120. The at least one first sidewall 118 defines a first upper periphery 122 that further defines a first open top portion. Likewise, the second fluid container 114 can have at least one second sidewall 124 joined at a bottom portion to a second bottom member 126. The at least one second sidewall 124 defines a second upper periphery 128 that further defines a second open top portion. In an embodiment, the general shape of the first fluid container 112 and/or the second fluid container 114 can approximate that of a half-cylinder in which the respective flat or generally flattened sides are juxtaposed at the mating interface 116. However, other shapes and sizes of either the first fluid container 112 and/or the second fluid container 114 can be utilized with no loss of function or benefit.

One or both of the first fluid container 112 and the second fluid container 114 can have a handle. For example, the first fluid container 112 can have a first handle 130 extending from a portion of the first fluid container 112, such as being joined to the at least one first sidewall 118. Likewise, the second fluid container 114 can have a second handle 132 extending from a portion of the second fluid container 114, such as being joined to the at least one second sidewall 124. In an embodiment, as shown in FIGS. 6-7, one or both of the first handle 130 and the second handle 132 can be joined near the top of the sidewall portions of their respective fluid containers, and extend away from their respective fluid containers sufficiently to permit a person using the handheld dual container 100 to hold the handheld dual container 100. In an embodiment, as shown, one or both of the first handle 130 and the second handle 132 can have a substantially inverted L-shape, such that when joined to their respective sidewall portions of their respective fluid containers, a person's hand be inserted between the outer surface of the fluid container, and the inner side of the handle. Thus, a person can comfortably hold either the first fluid container 112 or the second fluid container 114 by sliding his or her hand into and under the inverted L-shape of the handle, with his or her fingers in contact with the outer surface of the fluid container. Other shapes, sizes, and configurations of a handle can be utilized, as desired.

The first handle 130 and the second handle 132 are disposed opposite to one another, with the handle configuration being such a first vertical centerline CL1 of the first handle 130 and a second vertical centerline CL2 of the second handle 132 reside substantially in the same plane, such as plane P shown in FIG. 4. Plane P (as described above in relation to handheld dual container 10) effectively bi-sects the handheld dual container 100 into two substantially equal halves. However, other handle configurations can be utilized, including having the handles disposed such that a plane defined by their respective centerlines does not substantially bisect the handheld dual container 100. For example, one or both of the first handle 130 and/or the second handle 132 can be disposed on the handheld dual container 100 nearer to the portion of their respective fluid containers associated with the mating interface 116.

In an embodiment, the handle on either of the first fluid container 112 and the second fluid container 114 is optional, that is, the handheld dual container 100 can be utilized with no handles; the user simply grasps one of the first fluid container 112 and the second fluid container 114 directly. Additionally, in an embodiment, only one of either of the first fluid container 112 and the second fluid container 114 has a first handle, with the second handle being optional, that is, the handheld dual container 100 can be configured and utilized with only one handle.

The first fluid container 112 and the second fluid container 114 can be removably joined at the mating interface 116 by a first joining member 136 and a second joining member 138, respectively. First joining member 136 and a second joining member 138 can have components that are identical in size, shape, and spacing, and cooperate to removeably join the first fluid container 112 and the second fluid container 114. In the illustrated embodiment the first joining member 136 has a first connection member 136A having two opposing slots and a second connection member 136B having two opposing tongues in a general T-shape. The components of the first joining member 136 and the second connection member 138 are generally parallel in orientation such that similar components on the second fluid container 114 can be slideably engaged therein. Thus, the second joining member 138 has a mating third connection member 138A having two opposing slots and a mating fourth connection member 138B having two opposing tongues in a general T-shape. The mating fourth connection member 138B is configured to slide into the two opposing slots of the first connection member 136A in a tongue-in-groove manner. Likewise, the second connection member 136B is configured to slide into the two opposing slots of the third connection member 138A in a tongue-in-groove manner.

In an embodiment the handheld dual container 100 can optionally have a hand securing member 140 (which can be the same or similar to that disclosed above with respect to the hand securing member 40 of handheld dual container 10) associated with either or both of the first handle 130 and the second handle 132. Likewise, in an embodiment, one or both of the first fluid container 112 and the second fluid container 114 can optionally have disposed thereon one or more magnetic members, as disclosed above with respect to handheld dual container 10.

Referring now to FIG. 7, there is shown the dual handheld container 100 in a joined configuration. To join the first fluid container 112 to the second fluid container 114 the components of the second joining member 138 can be slid into the corresponding components of the first joining member 136, or vice versa. In an embodiment, the first joining member 136 and a second joining member 138 are held by frictional engagement when joined. In other embodiments, the first joining member 136 and the second joining member 138 can be one of adhesive members, magnetic members, hook-and-loop fastening members, and the like.

The first fluid container 112 and the second fluid container 114 can be made of any suitable material, including plastic. In an embodiment, the first fluid container 112 and the second fluid container 114 are molded plastic, including injection molded.

Figure 8:
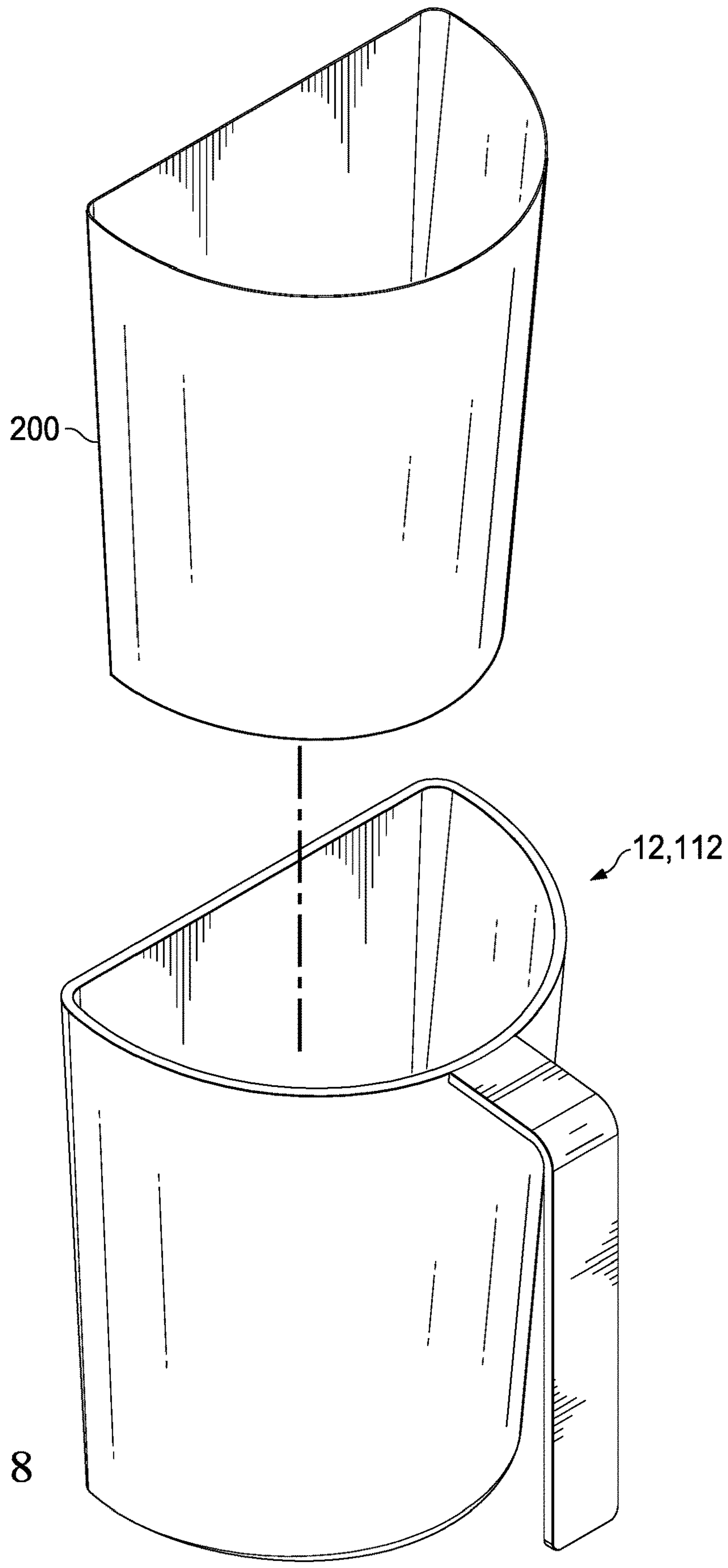
FIG. 8 is a perspective view of an example system and apparatus for handheld dual container.

Referring now to FIG. 8, there is shown an embodiment of one of the containers of a handheld dual container 10 and/or 100 having a disposable fluid container insert (not shown in the FIGS.) can be sized and shaped to fit into one or both of the first fluid container 12, 112 (depicted), and the second fluid container 14, 114. For example, a paper cup-like insert 200 can be provided and used by inserting it into any or all of the fluid containers, and can be filled with a fluid, such as paint. The disposable fluid container insert 200 can be removed and discarded after use, thereby simplifying cleanup of the handheld dual container 10, 100. In an embodiment, the disposable fluid container insert 200 can have a size and shape such that it fits snugly into either of the first fluid container 12, 112 and the second fluid container 14, 114.

Figure 9:
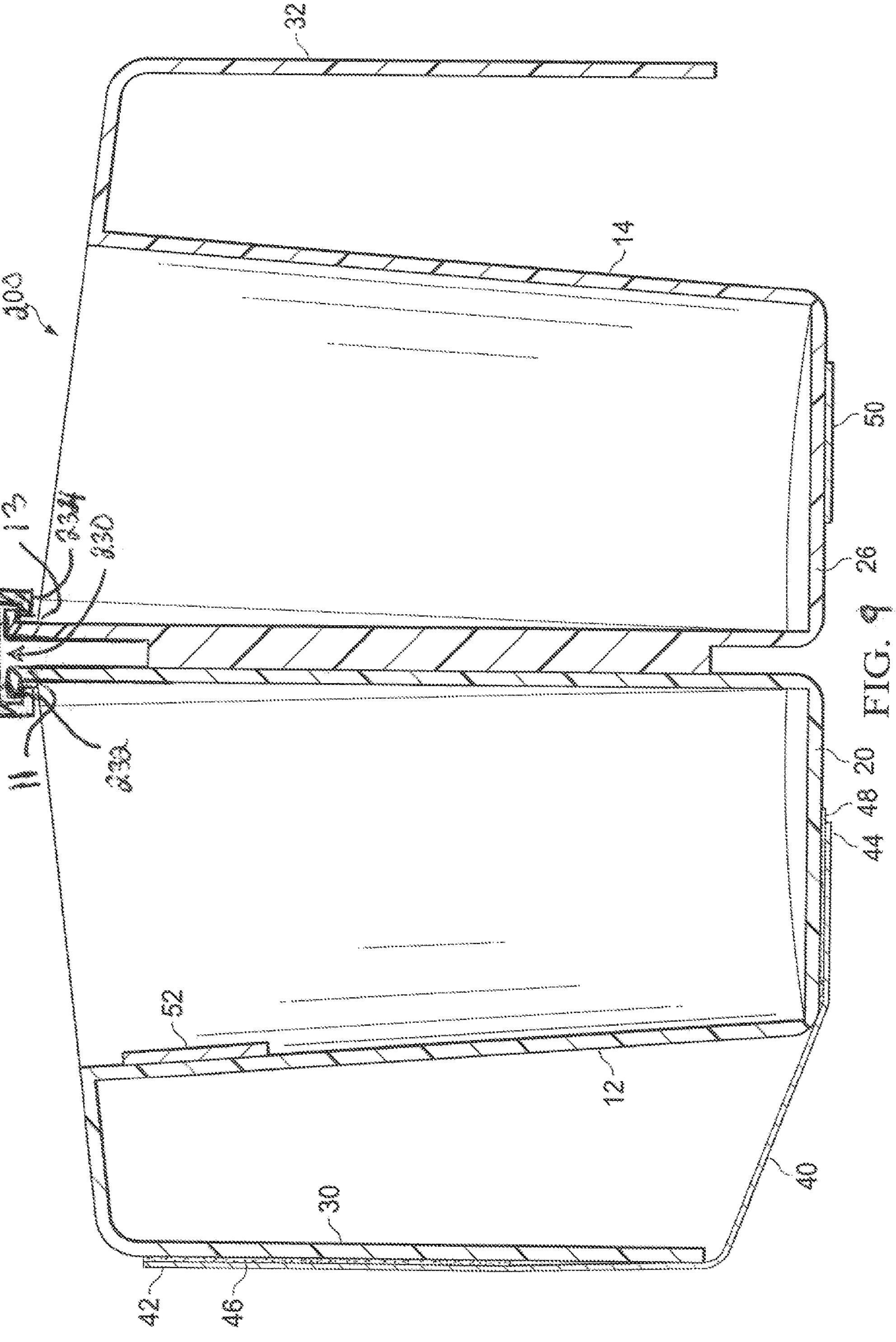
FIG. 9 is a cross sectional view of another embodiment of the handheld dual container of FIG. 1, including an illustrative T-connector.

Referring now to FIG. 9, there is shown an example embodiment of a handheld dual container 200. Handheld dual container 200 may include one or more of the features or combinations thereof of the handheld dual containers shown and described herein such as, for example handheld dual containers 10 and/or 100. Handheld dual container 200 may further include a connector 220. In some embodiments, connector 220 is a means for preventing the first and second containers from sliding apart. In the illustrative embodiment shown in FIG. 9, container 200 comprises the first container 12 and second container 14. The first container 12 further includes a first male connector member 226 that extends from an upper, inner edge of the first container. As shown, first male connector member 226 may include a vertical component and a horizontal component that form a substantially L-shape. The second container 14 further includes a second male connector member 228 that extends from an upper, inner edge of the second container. As shown, second male connector member 228 may include a vertical component and a horizontal component that form a substantially L-shape. As shown in this embodiment, the respective horizontal components of the first and second male connector members 226, 228 extend from their respective vertical members in a direction opposite from each other. When the first and second containers 12, 14 are brought together and/or connected, the respective first and second male connectors 226, 228 may form a T-shape or something similar to or resembles a T-shape. The first and second male connectors 226, 228 may be considered party of connector 220 or separate from connector 220.

Figure 10:
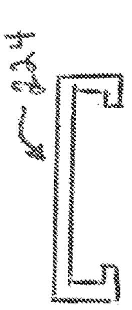
FIG. 10 is a side elevational view of a female connector of the example connector shown in FIG. 9.

Referring to FIGS. 9 and 10, connector 220 may further include a female connector 224 that fits over both the first and second male connectors 226, 228. In some embodiments the female connector 224 may comprise a member that forms a channel 230, a first end 232 and a second end 234. First and second ends 232, 234 may be configured to engage first male connector 226 and second male connector 228, respectively. Female connector, in some embodiments which may include the embodiment shown in FIG. 9, may be configured to slide or snap onto first and second male connectors. Such connection may be constructed to be a friction fit or engagement or a loose engagement. It is understood that connector 220 may comprise the reciprocal arrangement of the embodiment described above.

Illustrative embodiments of connector 220 and/or means for prevention first and second container from sliding apart may include, but not be limited to, T-connectors, friction fit connectors, snap-fit connectors, tongue and groove, any similar type connectors, and/or combinations thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A handheld dual container, comprising:

a first fluid container; and a second fluid container;

wherein each of the first and second fluid containers comprises a bottom portion, one or more first sidewalls extending upward from the bottom portion; and a second sidewall adjoining at least one of the one or more first sidewalls and extending upward from the bottom portion, the one or more first sidewalls and the second sidewall defining an upper periphery that defines an open top portion;

wherein outer surfaces of the respective second sidewalls of the first and second fluid containers are releasably attachable to each other by two sets of corresponding joining members;

wherein each of the two sets of corresponding joining members comprises a first joining member comprising a protrusion; and a second joining member comprising a track defining a groove; wherein the groove is configured to receive the protrusion; and wherein each of the outer surface of the first fluid container and the outer surface of the second fluid container comprises a first joining member and a second joining member.

2. The handheld dual container of claim 1, wherein the second sidewalls of each of the first and second fluid containers are substantially flat;

wherein when attached to each other, the first and second fluid containers form interior walls within the handheld dual container.

3. The handheld dual container of claim 1, wherein the two sets of corresponding joining members are substantially identical to each other.

4. The handheld dual container of claim 3, wherein when the first and second fluid containers are attached to each other, the respective first and second joining members of each of the first and second sets of joining members are secured to each other.

5. The handheld dual container of claim 1, wherein at least one of the first or second fluid containers further comprise a handle.

6. The handheld dual container of claim 5, wherein the handle is L-shaped and extends from the upper periphery of the respective first or second fluid container.

7. The handheld dual container of claim 6, further comprising a hand securing member configured to connect at a first end to an end of the handle and at a second end to the bottom portion of the respective first or second fluid container.

8. The handheld dual container of claim 1, wherein each of the first or second fluid containers further comprise a handle.

9. The handheld dual container of claim 8, wherein each handle is disposed on an opposite side of the handheld dual container, when the first and second fluid containers are attached to each other; wherein each handle defines a centerline of the respective fluid container; and wherein the centerlines reside substantially in the same plane.

10. The handheld dual container of claim 1 wherein the first and second fluid containers are nestable.

11. The handheld dual container of claim 1, further comprising a ladder magnet attachable to the bottom portion at least one of the first or second fluid containers.

12. The handheld dual container of claim 1, further comprising a brush magnet attachable to an inner surface of at least one of the one or more first sidewalls or the second sidewall for at least one of the first or second fluid containers.

13. The handheld dual container of claim 1, further comprising a connector configured to releasably join the upper periphery of the first and second fluid containers.

14. The handheld dual container of claim 13, wherein the upper periphery for the second sidewall for each of the first and second fluid containers comprises a male connector portion extending upward therefrom and having a horizontal component, the horizonal components extending in opposite directions; and wherein the connector includes a female connector portion configured to receive the male connector portions of each of the first and second fluid containers.

15. The handheld dual container of claim 1, wherein at least one of the one or more fluid containers is configured to receive a disposable fluid container insert.

16. The handheld dual container of claim 1, wherein the first and second fluid containers are substantially identical.

17. The handheld dual container of claim 1, wherein inner surfaces of the respective second sidewalls of the first and second fluid containers are substantially flat.

18. A handheld dual container, comprising:

a first fluid container; and a second fluid container;

wherein each of the first and second fluid containers comprises:

a bottom portion;

a first sidewall extending upward from the bottom portion;

a second sidewall adjoining the first sidewall and extending upward from the bottom portion, the first sidewall and the second sidewall defining an upper periphery that defines an open top portion; and an L-shaped handle extending from the upper periphery;

wherein at least a portion of each of the first sidewalls is curved, at least a portion of the each of the second sidewalls is substantially flat, and the respective second sidewalls of the first and second fluid containers are releasably attachable to each other by corresponding joining members;

wherein an outer surface of the second sidewall of each of the first fluid container and the second fluid container comprises a protrusion and track defining a groove; wherein the protrusion and the track on the respective fluid container are substantially parallel to each other and configured for slidable connection with the corresponding track and protrusion of the other fluid container.

* * * * *